2 Sheets--Sheet 1.

W. N. ESSELSTYN.
Middlings-Purifiers.

No. 156,457.

Patented Nov. 3, 1874.

Witnesses.
James Martin Jr
G. N. Campbell

Inventor:
Wm N. Esselstyn
by
Mason, Fenwick & Lawrence

W. N. ESSELSTYN.
Middlings-Purifiers.

No. 156,457.

Patented Nov. 3, 1874.

UNITED STATES PATENT OFFICE.

WILLIAM N. ESSELSTYN, OF FORT ATKINSON, WISCONSIN, ASSIGNOR OF ONE-HALF HIS RIGHT TO ELI P. MAY, OF SAME PLACE.

IMPROVEMENT IN MIDDLINGS-PURIFIERS.

Specification forming part of Letters Patent No. 156,457, dated November 3, 1874; application filed July 21, 1874.

*To all whom it may concern:*

Be it known that I, WILLIAM N. ESSELSTYN, of Fort Atkinson, in the county of Jefferson and State of Wisconsin, have invented a new and useful Improvement in Middlings-Purifiers; and I do hereby declare that the following is a full, clear, and exact description thereof, reference being had to the accompanying drawings making part of this specification, in which—

Figure 1:
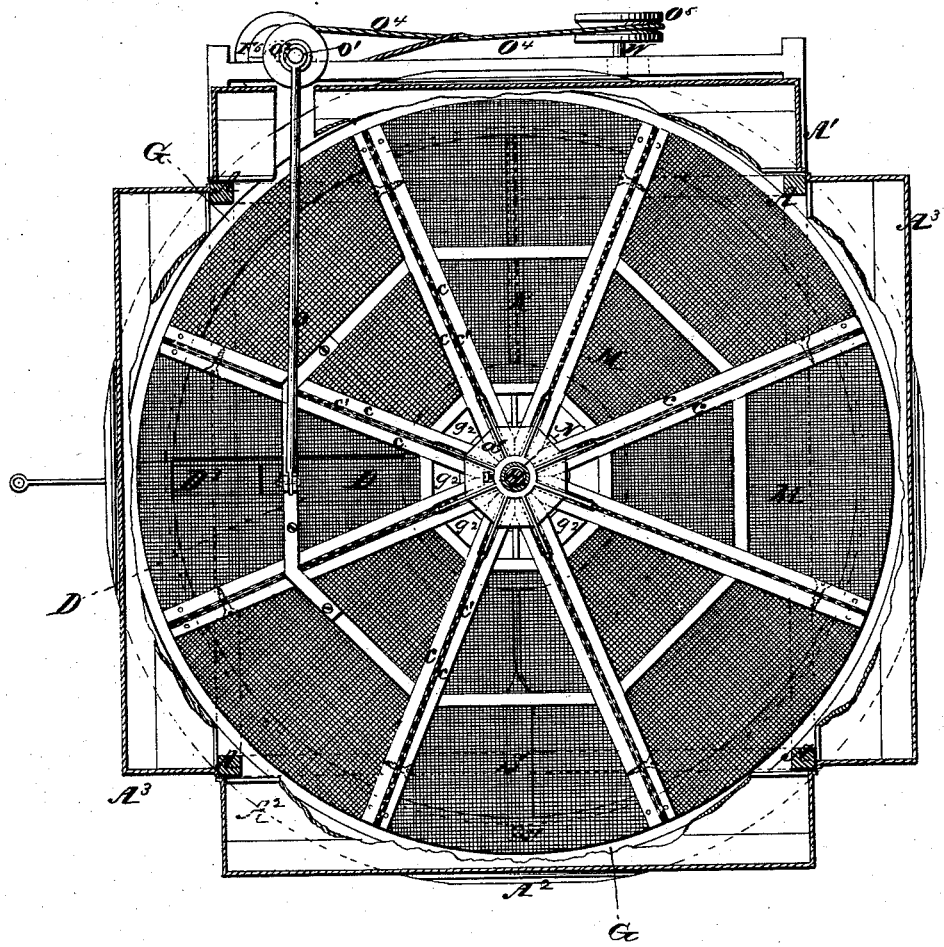
Figure 2:
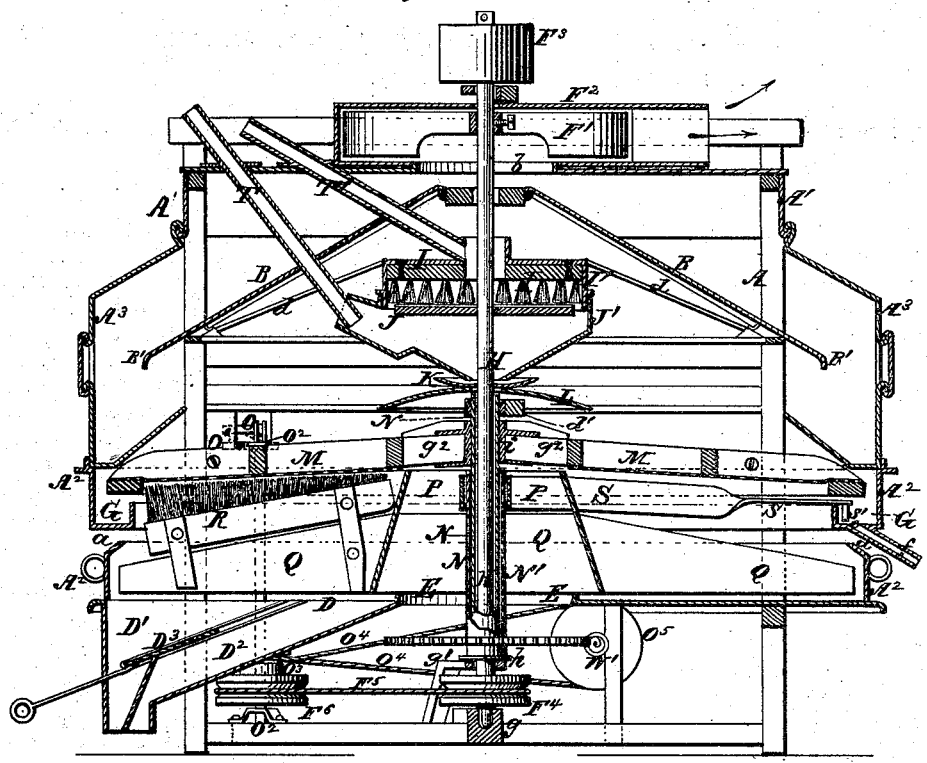
Figure 3:
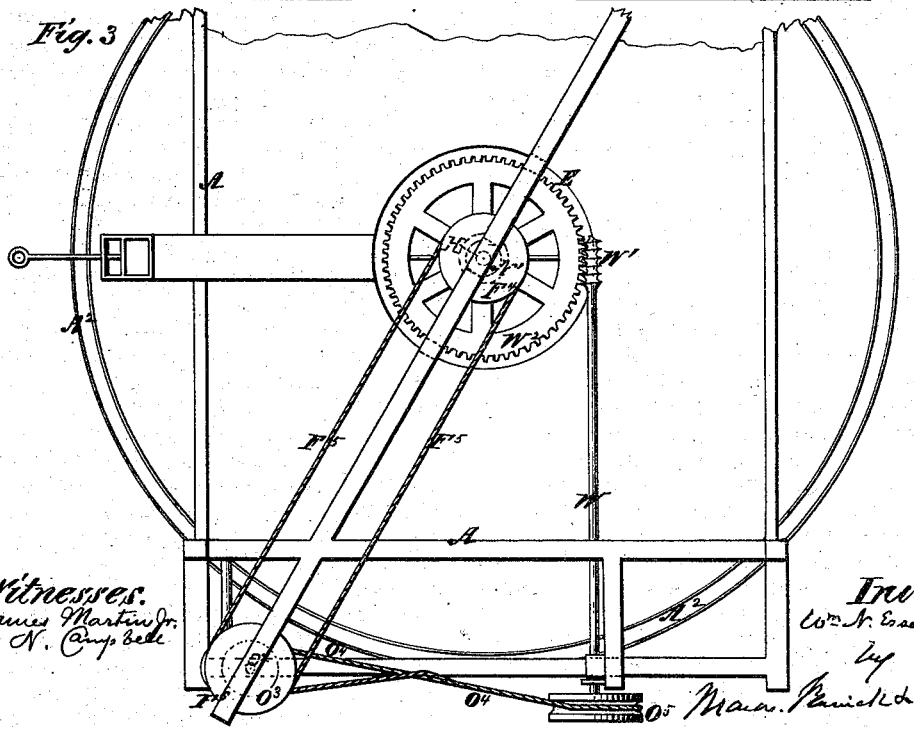

Figure 1 is a horizontal section of the middlings-purifier in the line $xx$ of Fig. 2. Fig. 2 is a vertical central section of the same. Fig. 3 is an inverted bottom view of the same.

The nature of my invention consists, first, in a circular shaker or bolting-screen, made up of several triangular sections, inclined and united upon the edges of the bolting-cloth on lines radial to a central hub, and held together by a flanged hub and clamping-screws, each section forming an independent bolting-chamber, and capable of discharging the bran and foreign substances resting on it over the circumference or rim of the screening-cloth, as hereinafter specified; second, in the combination of a vibrating screening-shaker, a case having an air-inlet below the shaker, and an inlet for supplying air above the shaker, an air-directing plate, and a suction-fan, whereby the middlings are subjected to under and upper currents of air drawn in from different points by the fan, and kept separated until they meet above the screening-shaker and together bear away the light foreign matters, as will be presently described; third, in an inclined shaker or bolting-screen of circular form, which vibrates in combination with a stationary trough or gutter for receiving the bran or other foreign substances, and with a receptacle or case having a floor in which a discharge for the middlings is provided, and with a revolving sweeping arm or arms on the air-conductor, and with a brush or brushes on the sweeping-arms for opening the meshes of the bolting-cloth, and with a scraper revolving round in the bran-gutter, all combined as hereinafter described; fourth, in the combination of a frame having a case of partly cylindrical form and partly rectangular, the cylindrical part being open on its circumference below the shaker, a circularly-vibrating screening-shaker or bolting-screen, an inclined intermediate deck, side pockets set opposite the open sides of the frame and above the shaker, a distributing-disk, a hopper, a feed-spout, and a suction-fan; fifth, in the combination of the scourer inclosed in a case having a supply-spout, a receiving-hopper, a spreading or distributing plate, a vibrating screening-shaker inclosed in an outer case having a supply-spout, all as hereinafter described; sixth, in a combination of solid and tubular shafts, screw and worm gears, and pulleys and belts, whereby the different movable parts of the machine are supported around and operated from the central axis or shaft of the machine with variant speeds.

A $A^1$ $A^2$ represent the frame and casing. The part $A^2$ of the casing is cylindrical and open all around between its upper and lower edge, as indicated at $a$, for the admission of air to supply the suction-fan. The part $A^1$ is rectangular, and has four removable pockets, $A^3$, for the reception of bran and light matters during the operation of purifying middlings. The top and bottom of this case are closed tight except at those points where inlet and outlet passages are applied. Between the top of the case and its bottom (very near the top) an inclined deck, B, is constructed so that its lower edges extend a short distance into the bran-pockets, as indicated at B', and act as deflectors to the bran, causing it to fall down into the pocket, while the currents of air pass around them and up to the fan $F^1$, which is on top of the case A, and is in communication with its interior by means of a passage, $b$, in the top of the case. D is an oblong discharge-passage in the floor or bottom of the case, and $D^1$ $D^2$ is a spout divided into two channels, and furnished with an inclined regulating-valve, $D^3$. It is arranged on the under side of the bottom of the case, directly under the oblong opening D, so as to be in communication with the case by means of said opening, as shown. E is an air-passage at the center of the floor or bottom of the case. G is a gutter-shaped flange projecting from the inner side of the circular portion $A^2$ of the case, and having a discharge-passage, $e$, leading from it into a spout, $f$, as shown. H is a revolving solid shaft, extending up centrally through the case $A^1 A^2$ from a step, $g$, below the same, and passing out of the top of the case through the fan $F^1$ and fan-case $F^2$, and receiving on its end a driving-pulley, $F^3$. Around this shaft a stationary brush, I, a casing, $I'$, for said brush, a radially-grooved scouring-plate, J, a concentrating-hopper, $J'$, a middlings-distributing disk, K, and a convex air-deflecting plate, L, are arranged. The plate J and the disk K revolve with the shaft H, and the other parts just named are stationary, being supported by suitable bridge-trees of the frame A. Below the distributing-disk K and the plate L a circular bolting or screening shaker, M, is arranged upon a short tubular shaft, N, placed around the solid shaft H, and supported upon a step, $g^1$, by means of a circular flange, $h$, as shown. This bolting-screen or shaker is made up of several triangular sections, $c\ c$, each of which contains a piece of bolting-cloth, $c'$, clamped by its edges between adjoining side bars of the respective sections by means of screws passed through the bars, as shown. The rim-piece of each section is a segment of a circle, and the several rim-pieces are placed underneath the outer ends of the frame-bars which form the sections, so that bran and other matters may freely pass off the cloth into the gutter G. The sections are formed with partitions, and the bolting-cloth is not extended to the center of the shaker, but terminates some distance short thereof, in order to form free air-circulation passages $g^2\ g^2$ outside of the hub $i$ of the shaker, as shown. The shaker thus composed of the several sections, and constructed and united together, and stayed by means of the flanged hub $i$, is keyed upon the vibrating shaft N, so as to have its outer edge or rim stand above and overhang the trough G, as shown.

In practice, the sections may be made adjustable by slots and set-screws, so as to change their inclination.

O is a pitman, connected to the top of the shaker about midway of its diameter, and connected to an eccentric, $O^1$, on a vertical revolving shaft, $O^2$. This pitman vibrates the shaker circularly when the shaft $O^2$ is revolved. P is an inverted hollow truncated cone, placed around and fastened firmly to a short revolving tubular shaft, $N'$, which surrounds the shaft N, and rests upon the flange $h$ thereof. This cone is fitted over the air-passage E, and under the air-passages $g^2\ g^2$, so that air entering through passage E ascends through passages $g^2\ g^2$, and strikes the deflecting-plate L. By this device, in connection with the deflecting-plate and fan, the air is made to diffuse the middlings over the screens as they fall from the distributing-disk K. Q Q are radial sweep-arms, attached to the shaft $N'$ and cone P. These arms are set so as to just clear the floor of the case $A^1 A^2$, and their office is to sweep the middlings into the double-channeled spout $D^1 D^2$. R is a brush, applied on one of the arms Q, so as to impinge against the under side of the bolting-cloth, as shown, and keep its meshes open. S is a radial arm, having a vertical sweeping-plate, $s'$, on its outer end, and extending down into the gutter G. This arm is fastened to the cone and outer shaft $N'$, and revolves with it. Its office is to sweep the bran which falls into the gutter to the discharge-passage $e$ and into the spout $f$. T is the first feeding-spout, and $T'$ the spout through which the coarse or unfinished middlings are returned through the machine. The spout T feeds directly into the hopper $J'$ upon the disk K, and the spout $T'$ feeds the return middlings into the scouring-case $I'$, and therefrom they pass into the hopper $J'$ and upon the disk K and screen M.

The shaft H is revolved by the pulley $F^3$, and this motion is transferred by a pulley, $F^4$, and a belt, $F^5$, to a pulley, $F^6$, on the eccentric's shaft $O^2$. This motion is transmitted to the shaft $N'$ by the shaft $O^2$, a pulley, $O^3$, a belt, $O^4$, and a pulley, $O^5$, and a shaft, W, having a worm, $W^1$, on its end, and gearing with a screw-wheel, $W^2$, on the shaft $N'$.

The worm and screw gearing give a slow rotary motion to the shaft $N'$, and this causes the arms Q and the brush R and the scraper $s'$, with the cone P, to revolve slowly.

The eccentric of shaft $O^2$ receives a rotary motion, and vibrates the shaker rapidly. The central shaft receives a rapid motion, and the scouring-plate J and distributing-disk K revolve rapidly with it.

What I claim as new is—

1. The circular shaker or bolting-screen M, made up of triangular sections $c\ c$, inclined and united upon the edges of inclined bolting-cloth $c'$ on lines radial to a central hub, and held together by a flanged hub and clamping-screws, substantially as and for the purpose described.

2. The combination of the vibrating screening-shaker, the case having an air-inlet, $a$, leading below the shaker, and air-inlets E $g^2$ leading above the shaker, an air-directing plate, L, and a suction-fan, substantially in the manner and for the purpose described.

3. The combination of the vibrating inclined circular shaker M, bran-gutter G, case $A^1 A^2$, having the passage D and spouts $D^1 D^2$, revolving sweeping arm or arms Q, brush R, and scraper S $s'$, substantially as and for the purpose described.

4. The combination of the frame and case A $A^1 A^2$, having the passages D and $a$, a circularly-vibrating shaker, M, an inclined deck, B, the side pockets $A^3$, distributing-disk K, hopper $J'$, feed-spout T, and a suction-fan, $F^1$, substantially as and for the purpose described.

5. The combination, in a middlings-purifier, of the scourer I $I'$ J, having a spout, $T'$, the hopper J', air-deflecting plate L, vibrating screen-shaker M, fan F¹, and spout T, substantially in the manner and for the purpose herein described.

6. The combination of the shafts H, N, N', O², and W, the pulleys and belts, and the worm W¹ and screw-wheel W², for operating the different parts of the machine with different speeds and different motions from the driving-pulley F³, substantially as and for the purpose set forth.

WILLIAM N. ESSELSTYN.

Witnesses:
 GEO. W. BURCHARD,
 HENRY OGDEN.